United States Patent
Ghosh et al.

(10) Patent No.: US 11,392,800 B2
(45) Date of Patent: Jul. 19, 2022

(54) COMPUTER VISION SYSTEMS AND METHODS FOR BLIND LOCALIZATION OF IMAGE FORGERY

(71) Applicant: Insurance Services Office, Inc., Jersey City, NJ (US)

(72) Inventors: Aurobrata Ghosh, Pondicherry (IN); Zheng Zhong, Jersey City, NJ (US); Terrance E. Boult, Colorado Springs, CO (US); Maneesh Kumar Singh, Princeton, NJ (US)

(73) Assignee: Insurance Services Office, Inc., Jersey City, NJ (US)

( * ) Notice: Subject to any disclaimer, the term of this patent is extended or adjusted under 35 U.S.C. 154(b) by 0 days.

(21) Appl. No.: 16/919,840

(22) Filed: Jul. 2, 2020

(65) Prior Publication Data
US 2021/0004648 A1   Jan. 7, 2021

Related U.S. Application Data

(60) Provisional application No. 62/869,712, filed on Jul. 2, 2019.

(51) Int. Cl.
| | |
|---|---|
| *G06K 9/62* | (2022.01) |
| *G06N 3/04* | (2006.01) |
| *G06N 3/08* | (2006.01) |
| *G06V 10/30* | (2022.01) |
| *G06V 10/50* | (2022.01) |
| *G06V 20/40* | (2022.01) |

(52) U.S. Cl.
CPC ......... *G06K 9/6265* (2013.01); *G06K 9/6257* (2013.01); *G06N 3/04* (2013.01); *G06N 3/08* (2013.01); *G06V 10/30* (2022.01); *G06V 10/50* (2022.01); *G06V 20/40* (2022.01)

(58) Field of Classification Search
None
See application file for complete search history.

(56) References Cited

U.S. PATENT DOCUMENTS

| | | | |
|---|---|---|---|
| 5,465,308 A | 11/1995 | Hutcheson et al. | |
| 10,810,725 B1 * | 10/2020 | Dolhansky | G06N 3/00 |
| 10,925,568 B2 * | 2/2021 | Lu | A61B 6/032 |
| 2008/0222734 A1 | 9/2008 | Redlich et al. | |

(Continued)

OTHER PUBLICATIONS

Zhou, P., Han, X., Morariu, V. I., & Davis, L. S. (2018). Learning rich features for image manipulation detection. In Proceedings of the IEEE Conference on Computer Vision and Pattern Recognition (pp. 1053-1061). (Year: 2018).*

(Continued)

*Primary Examiner* — Michelle M Entezari
(74) *Attorney, Agent, or Firm* — McCarter & English, LLP

(57) ABSTRACT

Computer vision systems and methods for localizing image forgery are provided. The system generates a constrained convolution via a plurality of learned rich filters. The system trains a convolutional neural network with the constrained convolution and a plurality of images of a dataset to learn a low level representation of each image among the plurality of images. The low level representation is indicative of a statistical signature of at least one source camera model of each image. The system can determine a splicing manipulation localization by the trained convolutional neural network.

19 Claims, 12 Drawing Sheets

(56) References Cited

U.S. PATENT DOCUMENTS

| | | |
|---|---|---|
| 2010/0172567 A1 | 7/2010 | Prokoski |
| 2010/0290668 A1 | 11/2010 | Friedman et al. |
| 2011/0255788 A1 | 10/2011 | Duggan et al. |
| 2015/0036920 A1 | 2/2015 | Wu et al. |
| 2017/0032285 A1 | 2/2017 | Sharma et al. |
| 2020/0134056 A1* | 4/2020 | Sarkar ............... G06F 16/53 |
| 2020/0219135 A1* | 7/2020 | Hahn ............... G06F 3/012 |
| 2020/0272823 A1* | 8/2020 | Liu ............... G06K 9/00711 |

OTHER PUBLICATIONS

Alberti, M., Pondenkandath, V., Wursch, M., Bouillon, M., Seuret, M., Ingold, R., & Liwicki, M. (2018). Are you tampering with my data?. In Proceedings of the European Conference on Computer Vision (ECCV) Workshops (pp. 0-0). (Year: 2018).*

Liu, L., Shen, C., Wang, L., Hengel, A. V. D., & Wang, C. (2014). Encoding high dimensional local features by sparse coding based fisher vectors. arXiv preprint arXiv:1411.6406. (Year: 2014).*

Shu, Z., Qi, C., Xin, S., Hu, C., Wang, L., Zhang, Y., & Liu, L. (2016). Unsupervised 3D shape segmentation and co-segmentation via deep learning. Computer Aided Geometric Design, 43, 39-52. (Year: 2016).*

Google scholar citation evidence (Year: 2021).*

Wayback machine search (Year: 2021).*

Castillo Camacho, Ivan, and Kai Wang. "A simple and effective initialization of CNN for forensics of image processing operations." Proceedings of the ACM Workshop on Information Hiding and Multimedia Security. 2019. (Year: 2019).*

Bayar, Belhassen, and Matthew C. Stamm. "Constrained convolutional neural networks: A new approach towards general purpose image manipulation detection." IEEE Transactions on Information Forensics and Security 13.11 (2018): 2691-2706. (Year: 2018).*

Wu, Kaijun, et al. "An Improved Method of Median Filtering Forensics for Enhanced Image Security Detection." 2021 International Conference on Networking and Network Applications (NaNA). IEEE, 2021. (Year: 2021).*

Qiu, Xiaoqing, et al. "A universal image forensic strategy based on steganalytic model." Proceedings of the 2nd ACM workshop on Information hiding and multimedia security. 2014. (Year: 2014).*

Kang, Xiangui, Tengfei Qin, and Hui Zeng. "Countering median filtering anti-forensics and performance evaluation of forensics against intentional attacks." 2015 IEEE China Summit and International Conference on Signal and Information Processing (ChinaSIP). IEEE, 2015. (Year: 2015).*

Fridrich, Jessica, and Jan Kodovsky. "Rich models for steganalysis of digital images." IEEE Transactions on information Forensics and Security 7.3 (2012): 868-882. (Year: 2012).*

Ye, Jian, Jiangqun Ni, and Yang Yi. "Deep learning hierarchical representations for image steganalysis." IEEE Transactions on Information Forensics and Security 12.11 (2017): 2545-2557. (Year: 2017).*

Rao, Yuan, and Jiangqun Ni. "A deep learning approach to detection of splicing and copy-move forgeries in images." 2016 IEEE International Workshop on Information Forensics and Security (WIFS). IEEE, 2016. (Year: 2016).*

Zhang, Rongyu, and Jiangqun Ni. "A dense u-net with cross-layer intersection for detection and localization of image forgery." ICASSP 2020-2020 IEEE international conference on acoustics, speech and signal processing (ICASSP). IEEE, 2020. (Year: 2020).*

International Search Report of the International Searching Authority dated Sep. 25, 2020, issued in connection with International Application No. PCT/US2020/040681 (3 pages).

Written Opinion of the International Searching Authority dated Sep. 25, 2020, issued in connection with International Application No. PCT/US2020/040681 (4 pages).

Chen, et al., "Determining Image Origin and Integrity Using Sensor Noise," IEEE Transactions on Information Forensics and Security, vol. 3, No. 1, Mar. 2008 (17 pages).

Bondi, et al., "First Steps Toward Camera Model Identification with Convolutional Neural Networks," IEEE Signal Processing Letters, vol. 24, No. 3, Mar. 2017 (5 pages).

Bayar, et al., "Constrained Convolutional Neural Networks: A New Approach Towards General Purpose Image Manipulation Detection," IEEE Transactions on Information Forensics and Security, vol. 13, No. 11, Nov. 2018 (16 pages).

Bayar, et al., "Augmented Convolutional Feature Maps for Robust CNN-Based Camera Model Identification," IEEE International Conference on Image Processing, 2017 (5 pages).

Barni, et al., "Higher-Order, Adversary-Aware, Double JPEG-Detection via Selected Training on Attacked Samples," 25th European Signal Processing Conference (2017) (5 pages).

Bappy, et al., "Exploiting Spatial Structure for Localizing Manipulated Image Regions," IEEE International Conference on Computer Vision (2017) (10 pages).

Agarwal, et al., "Photo Forensics from JPEG Dimples," IEEE Workshop on Informational Forensics and Security (2017) (6 pages).

Lukas, et al., "Digital Camera Identification from Sensor Pattern Noise," IEEE Transactions on Information Forensics and Security, vol. 1, No. 2, Jun. 2006 (10 pages).

Huh, et al., "Fighting Fake News: Image Splice Detection via Learned Self Consistency," Computer Vision—ECCV 2018 (19 pages).

He, et al., "Deep Residual Learning for Image Recognition," IEEE Conference on Computer Vision and Pattern Recognition (2016) (9 pages).

Gloe, et al., "The 'Dresden Image Database' for Benchmarking Digital Image Forensics," 25th Symposium on Applied Computing (ACM SAC 2010) (7 pages).

Fridrich, et al., "Rich Models for Steganalysis of Digital Images," IEEE Transactions on Information Forensics and Security, vol. 7, No. 3, Jun. 2012 (15 pages).

Fiscus, et al., "The 2017 Nimble Challenge Evaluation: Results and Future Directions," CVPR Workshop on Media Forencis, Jul. 26, 2017 (34 pages).

Carvahlo, et al., "Exposing Ditigal Images Foregeries by Illumination Color Classification," IEEE Transactions on Information Forensics and Security, vol. 8, No. 7, Jul. 2013 (13 pages).

Cozzolino, et al., "Noiseprint: A CNN-Based Camera Model Fingerprint," arXiv:1808.08396v1 (2018) (13 pages).

Cozzolino, et al., "ForensicTransfer: Weakly-Supervised Domain Adaptation for Forgery Detection," arXiv:1812.02510v2 (2019) (13 pages).

Cozzolino, et al., "Splicebuster: A New Blind Image Splicing Detecor," IEEE International Workshop on Information Forensics and Security (2015) (6 pages).

Cozzolino, et al., "Recasting Residual-Based Local Descriptors as Convolutional Neural Networks: an Application to Image Forgery Detection," arXiv:1703.04615v1 (2017) (7 pages).

Zhou, et al., "Learning Rich Features for Image Manipulation Detection," IEEE/CVF Conference on Computer Vision and Pattern Recognition (2018) (9 pages).

Zampoglou, et al., "Large-Scale Evaluation of Splicing Localization Algorithms for Web Images," Multimedia Tools and Applications (2017) (34 pages).

Choi, et al., "Souice Camera Identification by JPEG Compression Statistics for Image Forensics," IEEE Region Conf. TENCON (2006) (4 pages).

Salloum, et al., "Image Splicing Localization Using a Multi-Task Fully Convolutional Network (MFCN)," Journal of Visual Communication and Image Representation 51 (2018) (9 pages).

Rossler, et al., "FaceForensics++: Learning to Detect Maniuplated Facial Images," arXiv:1901.08971v3 (2019) (14 pages).

Qiao, et al., "Individual Camera Device Identification from JPEG Images," Signal Processing: Image Communication 52 (2017) (13 pages).

Popescu, et al.,, "Exposing Digital Forgeries in Color Filter Array Interpolated Images," IEEE Transactions on Signal Processing, vol. 53, No. 10, Oct. 2005 (12 pages).

Mayer, et al., "Learned Forensic Souice Similarity for Unknown Camera Models," IEEE International Conference on Acuoustics, Speech and Signal Processing (2018) (5 pages).

(56) References Cited

OTHER PUBLICATIONS

Maes, et al., "Medial Image Registration Using Mutual Information," Proceedings of the IEEE, Vo. 91, No. 10, Oct. 2003 (24 pages).

* cited by examiner

140

| Dataset | #Img. | Format |
|---|---|---|
| DSO-1 [12] | 100 | PNG |
| NC16 [13] | 564 | JPEG (mostly) |
| Nc17-dev1 [13] | 1191 | JPEG (mostly) |

| Step (pixels) | F1 | MCC | ROC AUC |
|---|---|---|---|
| 24 | 0.59 | 0.53 | 0.85 |
| 36 | 0.65 | 0.61 | 0.89 |
| 48 | 0.69 | 0.65 | 0.91 |
| 60 | 0.68 | 0.64 | 0.91 |
| 72 | 0.67 | 0.64 | 0.90 |

| Step (pixels) | F1 | MCC | ROC AUC |
|---|---|---|---|
| 24 | 0.18 | 0.12 | 0.64 |
| 36 | 0.19 | 0.13 | 0.65 |
| 48 | 0.45 | 0.41 | 0.81 |
| 60 | 0.4 | 0.36 | 0.78 |
| 72 | 0.22 | 0.17 | 0.67 |

| Step (pixels) | F1 | MCC | ROC AUC |
|---|---|---|---|
| 24 | 0.33 | 0.17 | 0.70 |
| 36 | 0.34 | 0.19 | 0.71 |
| 48 | 0.38 | 0.22 | 0.73 |
| 60 | 0.36 | 0.22 | 0.73 |
| 72 | 0.36 | 0.23 | 0.74 |

|        | DSO-1       | NC16        | NC17-dev1 |
|--------|-------------|-------------|-----------|
| EXIF-SC | 0.57 (0.52) | 0.38        | 0.41      |
| SB     | 0.66 (0.66) | 0.37 (0.36) | 0.43  |
| SD | 0.69    | 0.40    | 0.42      |

|        | DSO-1       | NC16        | NC17-dev1 |
|--------|-------------|-------------|-----------|
| EXIF-SC | 0.52 (0.42) | 0.36        | 0.18      |
| SB     | 0.61 (0.61) | 0.34 (0.34) | 0.2   |
| SD | 0.65    | 0.38    | 0.2   |

|        | DSO-1    | NC16     | NC17-dev1 |
|--------|----------|----------|-----------|
| EXIF-SC | 0.85     | 0.80     | 0.71      |
| SB     | 0.86     | 0.77     | 0.69      |
| SD | 0.91 | 0.81 | 0.73  |

FIG. 9C

COMPUTER VISION SYSTEMS AND METHODS FOR BLIND LOCALIZATION OF IMAGE FORGERY

RELATED APPLICATIONS

This application claims priority to United States Provisional Patent Application Serial No. 62/869,712 filed on Jul. 2, 2019, the entire disclosure of which is hereby expressly incorporated by reference.

BACKGROUND

Field of the Disclosure

The present disclosure relates generally to the field of computer vision. Specifically, the present disclosure relates to computer vision systems and methods for blind localization of image forgery.

Related Art

Photo-realistically altering the contents of digital images and videos is problematic as society becomes increasingly reliant on digital images and videos as dependable sources of information. Altering image contents is facilitated by the availability of image editing software and aggravated by recent advances in deep generative models. Digital image forensics focuses on this issue by addressing critical problems such as establishing a veracity of an image (i.e., manipulation detection), localizing a tampered region within the image (i.e., manipulation localization), and identifying an alteration type within the tampered region. It should be understood that different alternation types require different forensic techniques. One type of alteration includes introducing foreign material into an image. For example, splicing can be utilized to insert a part of one image into another image (i.e., the host image). Additionally, touch-up techniques such as sharpening and blurring may be utilized to make the image appear authentic. A well trained forgery expert can utilize splicing manipulations and additional touch-up techniques to manipulate an image to change its meaning.

Semantic information has had limited success in solving operations such as splicing and inpainting because skilled attackers utilize semantic structures to hide image alterations. Non-semantic pixel-level statistics have proven more successful since these statistics amplify low-level camera model specific distortions and noise patterns indicative of a camera model "digital fingerprint." A camera model digital fingerprint can aid in verifying the integrity of an image by determining whether the camera model fingerprint is consistent across an entirety of the image. Several hand-engineered, low-level statistics approaches have been explored. However, given the aforementioned availability of image editing software and the technological improvement of deep generative models, there is a need for forensic algorithms that can provide data-driven deep learning solutions for the localization of image forgery.

Therefore, there is a need for computer vision systems and methods which can improve the localization of image forgery while improving an ability of computer systems to more efficiently process data. These and other needs are addressed by the computer vision systems and methods of the present disclosure.

SUMMARY

The present disclosure relates to computer vision systems and methods for the localization of image forgery. The system generates a constrained convolution via a plurality of learned rich filters. The system trains an 18 layer convolutional neural network with the constrained convolution and a plurality of images of the Dresden Image dataset to learn a low level representation indicative of a statistical signature of at least one source camera model of each image among the plurality of images. In particular, the system extracts at least one noise residual pattern from each image among the plurality of images via the constrained convolution, determines a spatial distribution of the extracted at least one noise residual pattern, and suppresses semantic edges present in each image among the plurality of images by applying a probabilistic regularization. The system localizes a splicing manipulation present in an image of the dataset by the trained convolutional neural network. In particular, the system subdivides the image into a plurality of patches, determines a hundred-dimensional feature vector for each patch, and segments the plurality of patches by applying an expectation maximization algorithm to each patch to fit a two component Gaussian mixture model to each feature vector.

BRIEF DESCRIPTION OF THE DRAWINGS

The foregoing features of the disclosure will be apparent from the following Detailed Description, taken in connection with the accompanying drawings, in which:

FIG. 7 is a table illustrating test datasets utilized by the system of the present disclosure;

FIGS. 8A-C are tables illustrating quantitative overlap hyper parameter processing results for a range of pixels for different datasets and according to three different scoring metrics;

FIGS. 9A-C are tables illustrating quantitative processing results of the system of the present disclosure on different datasets and in comparison to different models;

DETAILED DESCRIPTION

Figure 1:
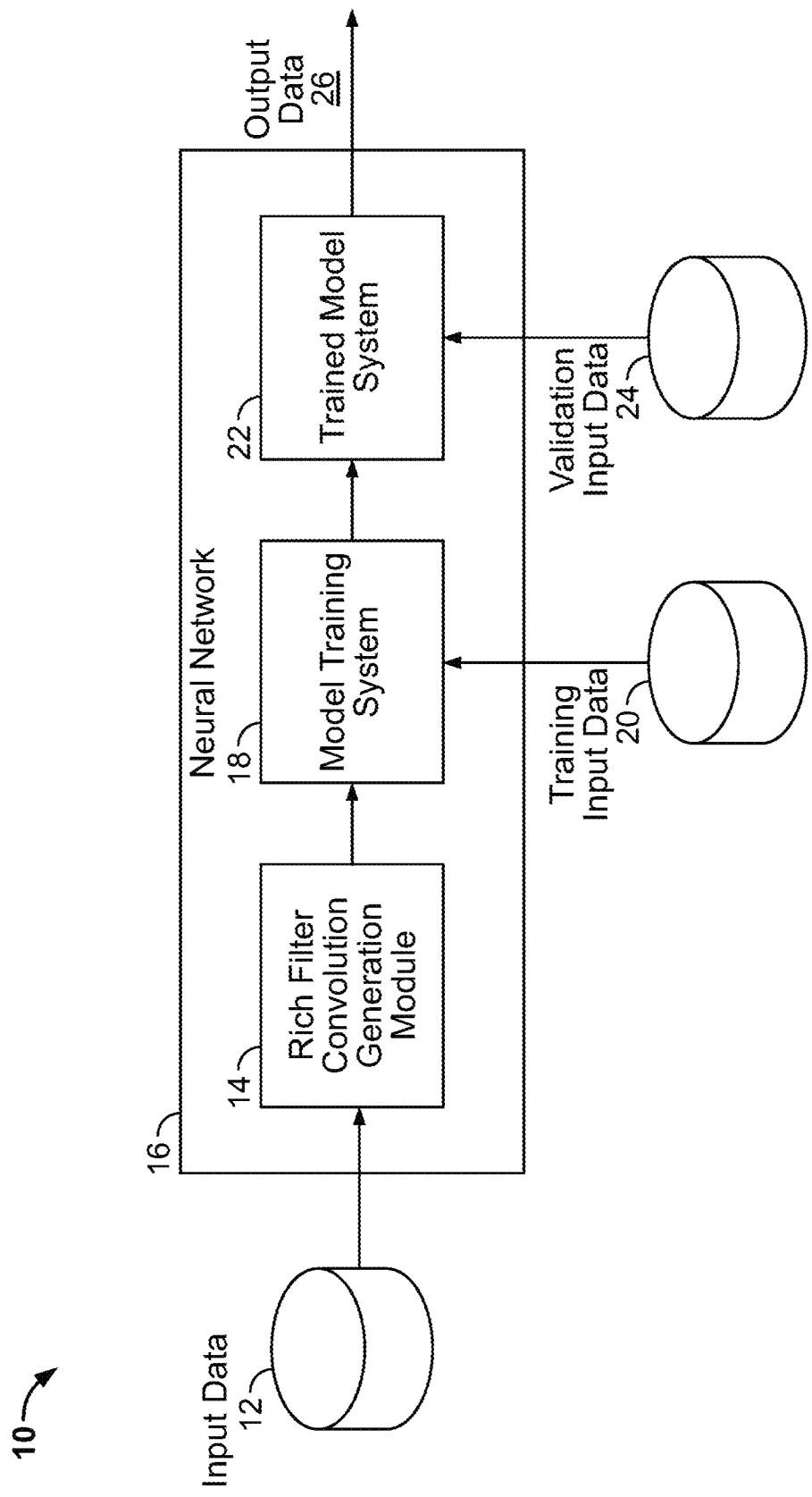
FIG. 1 is a diagram illustrating the system of the present disclosure.

The present disclosure relates to computer vision systems and methods for the localization of image forgery, as discussed in detail below in connection with FIGS. 1-12.

By way of background, the image formation process broadly consists of three stages: (1) sensor measurements; (2) in-camera processing; and (3) storage which may include compression.

The image formation process is unique for every camera model and yields subtle distortions and noise patterns in the image (i.e., a camera model "fingerprint") that are invisible to the eye. These subtle distortions and noise patterns are useful in forensic applications because they are specific to each camera model. Accordingly, forensic algorithms inspect low-level statistics of an image or inconsistencies therein to localize manipulations. These include distinctive features stemming from the hardware and software of a particular camera model (or a post-processing step thereafter). For example, at a lowest hardware level, a photo-response non-uniformity (PRNU) noise pattern is indicative of a digital noise fingerprint of a particular camera model and can be utilized for camera model identification. Additionally, sensor pattern noise originates from imperfections in the sensor itself and has shown to be sensitive to several manipulations types. Accordingly, sensor pattern noise can be utilized for the detection and localization of forgeries. However, sensor pattern noise is difficult to detect in image regions with high texture and is absent or suppressed in saturated and dark regions of an image. A color filter array (CFA) and its interpolation algorithms are also particular to a camera model and can aid in discerning camera models. In particular, (CFA) demosaicking is an in-camera processing step that produces pixel colors. Different detection and localization strategies based on CFA signature inconsistencies are known. However, the scope of such specialized CFA models is often limited. Joint Photographic Experts Group (JPEG) is a common storage form and carries camera model signatures such as dimples or can contain clues regarding post-processing steps such as traces of multiple compressions. Additionally, the JPEG image compression format can aid in discerning between single or multiple image compressions and distinguish between camera models. Although, JPEG statistics have been utilized for detection and localization tasks, these statistics are format specific and do not generalize to other common or new formats.

Traditional image forensic algorithms have modelled discrepancies in one or multiple such statistics to detect or localize splicing manipulations. Prior knowledge characterizing theses discrepancies has been leveraged to design handcrafted features. Learned image forensic approaches have gained popularity with the growing success of machine learning and deep learning. One approach recasts hand designed high pass filters, useful for extracting residual signatures, as a constrained convolutional neural network (CNN) to learn the filters and residuals from a training dataset. Another approach utilizes a dual branch CNN, one branch learning from image-semantics and the other branch learning from image-noise, to localize spliced regions. Yet another approach, leverages Exchangeable Image File Format (EXIF) metadata to train a Siamese neural network to verify metadata consistency among patches of a test image to localize manipulated pixels. Another known approach addresses state-of-the-art face manipulations including some created by deep neural networks and has demonstrated that learned CNNs outperform traditional methods. However, the success of the aforementioned deep learning approaches have typically shown vulnerability to generalizing to new datasets.

The systems and methods of the present disclosure utilize a CNN for blind splice detection. In particular, the system utilizes a CNN to detect splices in an image without prior knowledge of a source camera model of the image. The blind splice detection approach improves the generalization ability of the CNN by training the CNN on a surrogate task of source camera model identification. In particular, by training the CNN on the surrogate task of source camera model identification, the systems and methods of the present disclosure allow for leveraging of large, widely available and un-manipulated camera-tagged image databases for training. Further, it also provides for avoiding known manipulated datasets and the risk of overspecializing towards these datasets. Additionally, the CNN trains with a large number of camera models to improve generalization and the CNN's ability to segregate camera models.

The ability to differentiate (even unknown) camera models during training is important. As mentioned above, camera identification is useful in image forensics and several camera model identification approaches are known. For example, a known PRNU based camera identification algorithm estimates reference noise patterns utilizing wavelet de-noising and averaging, and subsequently matches the reference noise patterns to new images by correlation to determine the source camera model. Another known approach trains a CNN to compute features along with a Support Vector Machine (SVM) for source camera model identification. Another known approach utilizes learned high pass filters (i.e., rich filters (RFs)) from constrained convolution layers for source camera model identification. Additionally, another known approach, trains a similar learned RF based CNN for source camera model identification and utilizes the output of the CNN as features to train a second network for splice detection.

The systems and methods of the present disclosure utilize RFs and probabilistic regularization based on mutual information to learn low level features of source camera models and suppress semantic contents in training images. As mentioned above, the system and method of the present disclosure utilize a deep learning approach (i.e., a CNN) for blind splice detection. As such, the CNN does not have prior knowledge of source camera models corresponding to spliced image regions and host image regions. Rather, the CNN is trained to compute low-level features which can segregate camera models. The learned low level features comprise signatures of the image formation pipeline of a camera model including, but not limited to, hardware, internal processing algorithms and compression. In particular, the system and method of the present disclosure perform image splice localization by computing low-level features over an image which identify the signatures of multiple source camera models and segmenting the spliced image regions and the host image regions via a two component Gaussian mixture model. During image splice localization it is assumed that spliced image regions and host image regions originate from different source camera models.

Several RF approaches are known. For example, spatial rich models for steganalysis utilize a large set of hand-engineered RFs to extract local noise-like features from an image. The RFs extract residual information that highlights low level statistics over the image semantics by computing dependencies among neighboring pixels. Rich filters are effective in image forensics and have been widely adopted by various known splice detection algorithms. For example, SpliceBuster (SB) is a blind splice detection algorithm that utilizes a fixed RF to separate camera features from spliced regions and host regions. Another known algorithm utilizes three fixed RFs in a noise-branch to compute residuals along with a CNN to learn co-occurrence probabilities of the residuals as features to train a region proposal network to detect spliced regions. Yet another known algorithm utilizes a constrained convolution layer to learn RF-like features and a CNN to learn the co-occurrence probabilities from the data. In particular, at every iteration, the weights of the constrained convolution layer are projected to satisfy $w_k(0, 0)=-1$ and $\Sigma_{m,n\neq 0,0} w_k(m,n)=1$, where $w_k(i,j)$ is the weight of the $k^{th}$ filter at position $(i, j)$. The end-to-end trained network identifies broad image-level manipulations such as blurring and compression. It should be understood that the system and method of the present disclosure also utilize learned RFs, but employ a new constrained convolution layer and a different approach for applying the constraints.

Turning to the drawings, FIG. 1 is a diagram illustrating the system 10 of the present disclosure. The system 10 includes a neural network 16 having a rich filter convolution generation module 14 which receives input data 12, a model training system 18, and a trained model system 22. The neural network 16 also receives training input data 20 and validation input data 24, and outputs output data 26. The neural network 16 can be any type of neural network or machine learning system, or combination thereof, modified in accordance with the present disclosure to include the components shown and described herein. For example, the neural network 16 can be a deep neural network capable of, for example, image forgery localization and can use one or more frameworks (e.g., interfaces, libraries, tools, etc.). It should be understood that the neural network 16 can include the rich filter convolution generation module 14 as a layer of the neural network 16.

Figure 2:
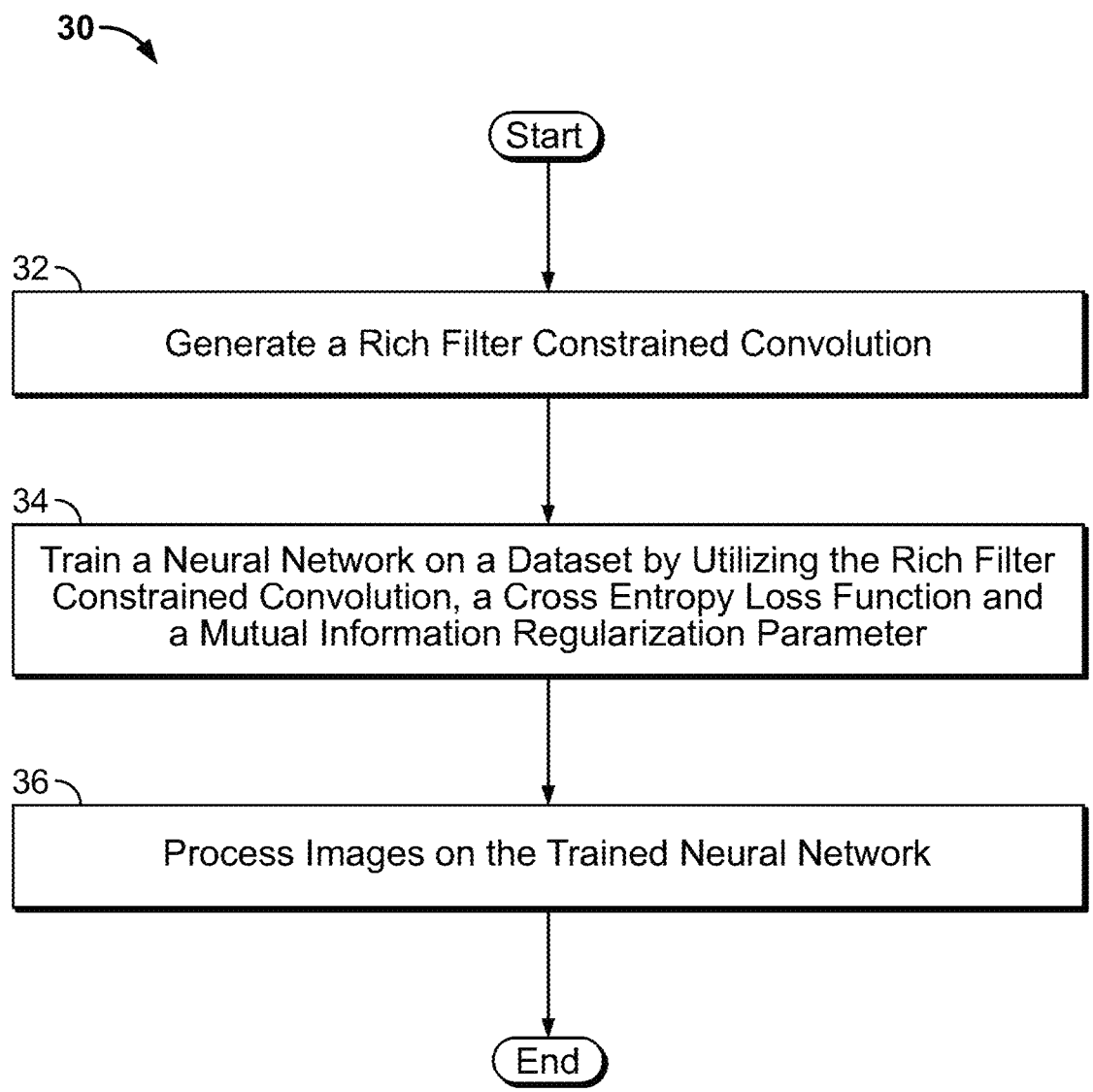
FIG. 2 is a flowchart illustrating overall processing steps carried out by the system of the present disclosure.

FIG. 2 is a flowchart 30 illustrating overall processing steps carried out by the system 10 of the present disclosure. Beginning in step 32, the rich filter convolution generation module 14 generates a constrained convolution to learn noise residuals. A noise residual is a statistical pattern that is a result of the combined processes of an imaging pipeline. A noise-residual can be discerned by suppressing the semantic contents of an image. As mentioned above, a learned noise residual can be considered as a camera model signature (i.e., fingerprint).

In step 34, the model training system 18 trains the neural network 16 utilizing the rich filter constrained convolution on training input data 20. In particular, the model training system 18 trains the neural network 16 to learn a representation indicative of a statistical fingerprint of a source camera model from an input image patch while suppressing the semantic edge content thereof. The system 10 also trains the neural network utilizing a cross entropy loss function and a mutual information based regularization parameter as described in further detail below in relation to FIGS. 3 and 4. The training input data 20 can include, but is not limited to, a predetermined number of images of the Dresden Image Database that consists of more than 17,000 JPEG images from 27 source camera models. It should be understood that the neural network 16 can be any type of neural network or machine learning system, or combination thereof. Then, in step 36, the trained model system 22 processes validation input data 24 to determine whether the system 10 can localize an image manipulation. The validation input data 24 can include, but is not limited to, a predetermined number of images of the DSO-1, Nimble Challenge 2016 (NC16) and the Nimble Challenge 2017 (NC17-dev1) datasets.

Figure 3:
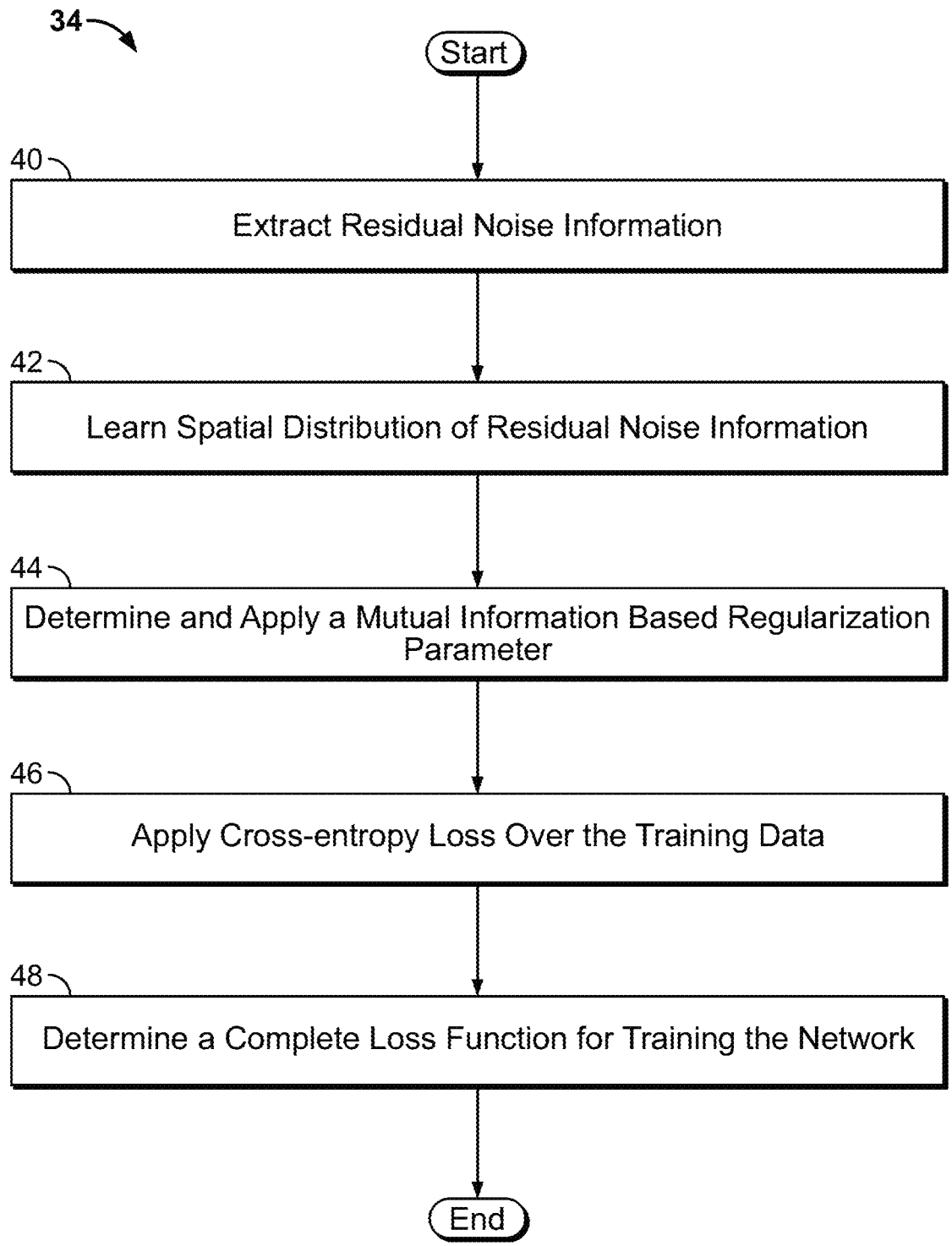
FIG. 3 is a flowchart illustrating step 34 of FIG. 2 in greater detail.

FIG. 3 is a flowchart illustrating step 34 of FIG. 2 in greater detail. Beginning in step 40, the system 10 utilizes learned rich filters (i.e., a constrained convolution) to extract residual noise information from an input patch of a color image. The learned rich filters suppress the semantic contents of the input patch by learning to compute residuals.

Then, in step 42, the system 10 learns a spatial distribution of the residual noise information. It should be understood that rich filters are high pass filters and therefore the rich filters accentuate semantic edges present in the input patch. As such, searching for patterns based on the rich filters can lead to learning misleading image specific information that is not independent of the image semantic content. Consequently, this can result in the system 10 learning information specific to the semantic contents of the training input data 20 thereby affecting its generalization ability. Therefore, in step 44, the system 10 suppresses the semantic edges present in the input patch by determining and applying a probabilistic mutual information based regularization parameter. The system 10 learns a hundred-dimensional feature vector characteristic of a camera model and independent of the image semantics based on the application of the mutual information based regularization parameter. In step 46, the system 10 utilizes the feature vector to drive and apply a cross entropy loss function over the training input data 20 and for segmentation during forgery localization. In step 48, the system 10 determines a complete loss function for training the neural network 16 based on constraints of the rich filters, the mutual information based regularization parameter and the cross entropy loss function.

Figure 4:
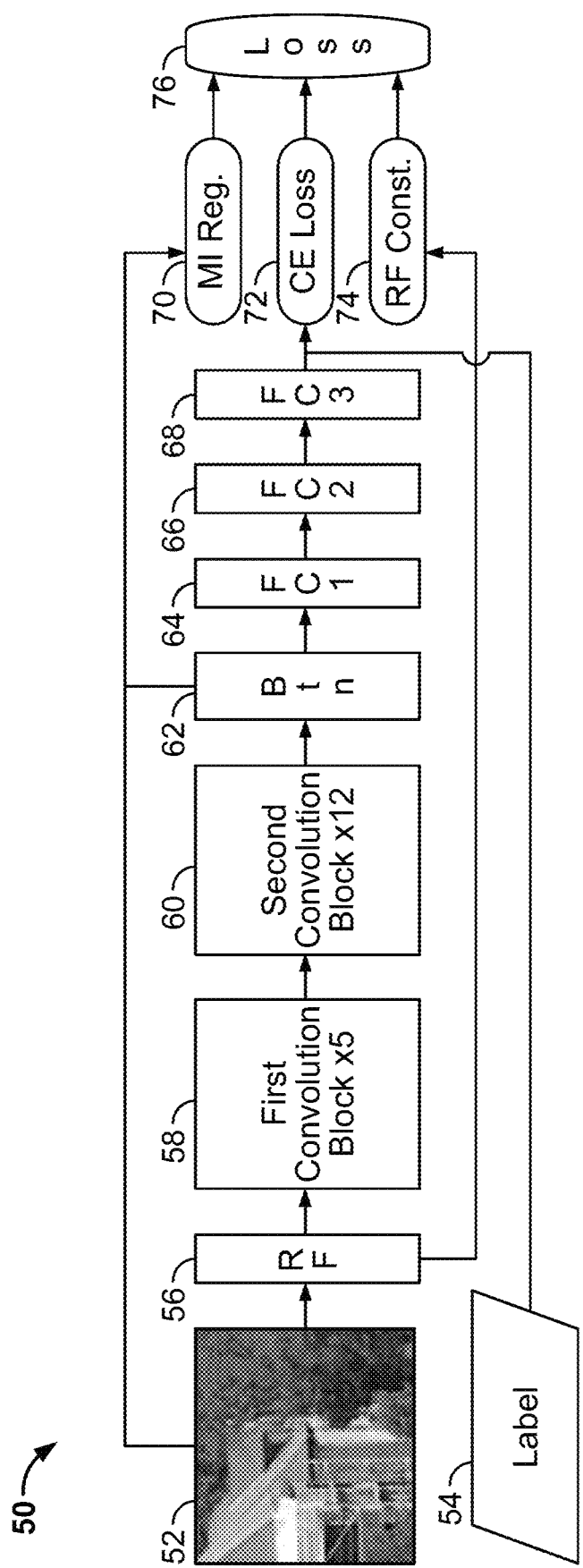
FIG. 4 is a diagram illustrating processing of an image by the neural network of the present disclosure.

FIG. 4 is a diagram 50 illustrating neural network processing carried out by the system 10 of the present disclosure. The system 10 includes an input patch 52, a camera model label 54, learned RFs 56 (a constrained convolution layer), a first convolution block 58, a second convolution block 60, a bottleneck layer 62, a first fully connected (FC) layer 64, a second FC layer 66, a third FC layer 68, a mutual information regularization layer, a cross entropy (CE) loss function 72, RF constraints 74, and a loss function 76.

Generally, the system 10 receives a red, blue and green (RGB) patch as the input patch $(P_i)$ 52. For example, the system 10 receives a 72×72×3 RGB patch as the input patch 52. Additionally, the system 10 also receives the camera model label 54 during training as an input. Then, the system 10 computes residuals via a 5×5×64 constrained convolution layer 56 comprising 64 learned RFs. In particular, the system 10 defines a residual to be a difference between a predicted value for a central pixel defined over its neighborhood and a scaled value of a pixel. The constrained convolution to learn residuals is defined by Equation 1 below as:

$$\mathcal{R}_{RF}^{(k)} = w_k(0,0) + \sum_{m,n\neq 0,0} w_k(m,n) = 0 \qquad \text{Equation 1}$$

for the $k^{th}$ filter, where the support of the residuals is a N×N neighborhood (N=5). The summation ensures that the predicted value and the pixel's value have opposite signs. As noted above, the system 10 utilizes a large bank of learned RFs, k=1 . . . 64. These constraints (i.e., RF constraints 74) are applied by including $$\mathcal{R}_{RF} = \left(\sum_k \left(\mathcal{R}_{RF}^{(k)}\right)^2\right)^{1/2}$$

as a penalty in the cost function. This provides for the neural network 16 to learn suitable residuals for camera model identification.

The first convolution block 58 comprises a 3×3×19 regular decimating convolution, batch normalization and a rectified linear unit (ReLU) activation and is repeated five times. The second convolution block 60 comprises identical first and second sub-blocks and a skip connection around the second sub-block. Each of the first and second sub-blocks consists of a 3×3×19 non decimating convolution, batch-normalization and ReLU activation. The skip connection adds an output of the first sub-block's ReLU activation to an output of the second sub-block's batch normalization. The second convolution block 60 is repeated twelve times.

The first convolution block 58 and second convolution block 60 architecture can be more effective than a standard residual block because it achieves approximately a ten percent improved validation accuracy regarding the surrogate task of camera model identification during training. Together, the first convolution block 58 and the second convolution block 60 learn the spatial distribution of residual values and can be interpreted as learning their co-occurrences. The final convolution is a 3×3×1 bottleneck layer 62 having an output that is a pre-feature image $p_i$ of size 56×56.

Following the bottleneck layer 62 are the first, second, and third FC layers 64, 66, 68. The first FC layer 64 comprises 75 neurons, the second FC layer 66 is the feature layer and comprises 100 neurons and the third FC layer 68 is the final layer that outputs logits with a number of neurons C corresponding to a number of training camera models. The first FC layer 64 is followed by a dropout layer with a keep probability of 0.8 and ReLU non-linearity. The system 10 trains the neural network 16 utilizing the cross-entropy loss function 72 over the training input data 20 as defined by Equation 2 below:

$$\mathcal{L}_{CE} = -\frac{1}{M}\sum_{i=1}^{M} y_i \log(\hat{y}_i)$$

Equation 2

In Equation 2, $y_i$ is the camera model label for the $i^{th}$ training data point in the mini batch of length M and $\hat{y}_i$ is the softmax value computed from the output of the third FC layer 68.

Mutual information is a well-known metric for registering medical images because it provides for capturing linear and non-linear dependencies between two random variables. Additionally, mutual information can effectively compare images of the same body part across different modalities with different contrasts (e.g., magnetic resonance imaging (MRI), computed tomography (CT), and positron emission tomography (PET)). The system 10 utilizes these mutual information characteristics to compute a dependency of the input patch $P_i$ 52 with the pre-feature image $p_i$ which is the output of the bottleneck layer 62. Since the pre-feature image $p_i$ is a transformed version of the residuals computed by the constrained convolution layer 56, the dependency reflects a presence of semantic edges in $p_i$. As such, the mutual information regularization can be defined by Equation 3 as follows:

$$\mathcal{R}_{MI} = -\frac{1}{M}\sum_{i=1}^{M} MI(\rho(P_i), p_i)$$

Equation 3 where $p(\cdot)$ provides for approximating mutual information numerically. In particular $p(\cdot)$ is defined as a transform that converts the input patch $P_i$ 52 to its gray scalar version then resizes it from its dimensions of 72×72×3 to the dimensions of 56×56 of the pre-feature image $p_i$. $p(\cdot)$ conserves the semantic edges in the input patch $P_i$ 52 and aligns them to the edges in the pre-feature image $p_i$. As such, in Equation 3 the system 10 can compute the mutual information regularization numerically by approximating $p(\rho(P_i))$, $p(p_i)$ and $p(\rho(P_i), p_i)$ the marginal and joint distribution of $P_i$ and $p_i$, using histograms (e.g., 50 bins). Histogram based mutual information computation is a common approximation that is widely used in medical imaging. However, histogram based mutual information computation can also be computationally inefficient which can result in extended training time as described in further detail below.

The complete loss function 76 for training the neural network 16 combines the mutual information regularization 70, the cross entropy loss function 72, the RF constraints 74 and an $l_2$ regularization of all weights, W, of the neural network 16 as defined by Equation 4 below:

$$\mathcal{L} = \mathcal{L}_{CE} + \lambda \mathcal{R}_{RF} + \gamma \mathcal{R}_{MI} + \omega \|W\|_2$$

Equation 4

In Equation 4, $\lambda$, $\gamma$, and $\omega$ balance the amount of the RF constraint penalty and mutual information and $l_2$ regularizations to apply along with the main loss.

Figure 5:
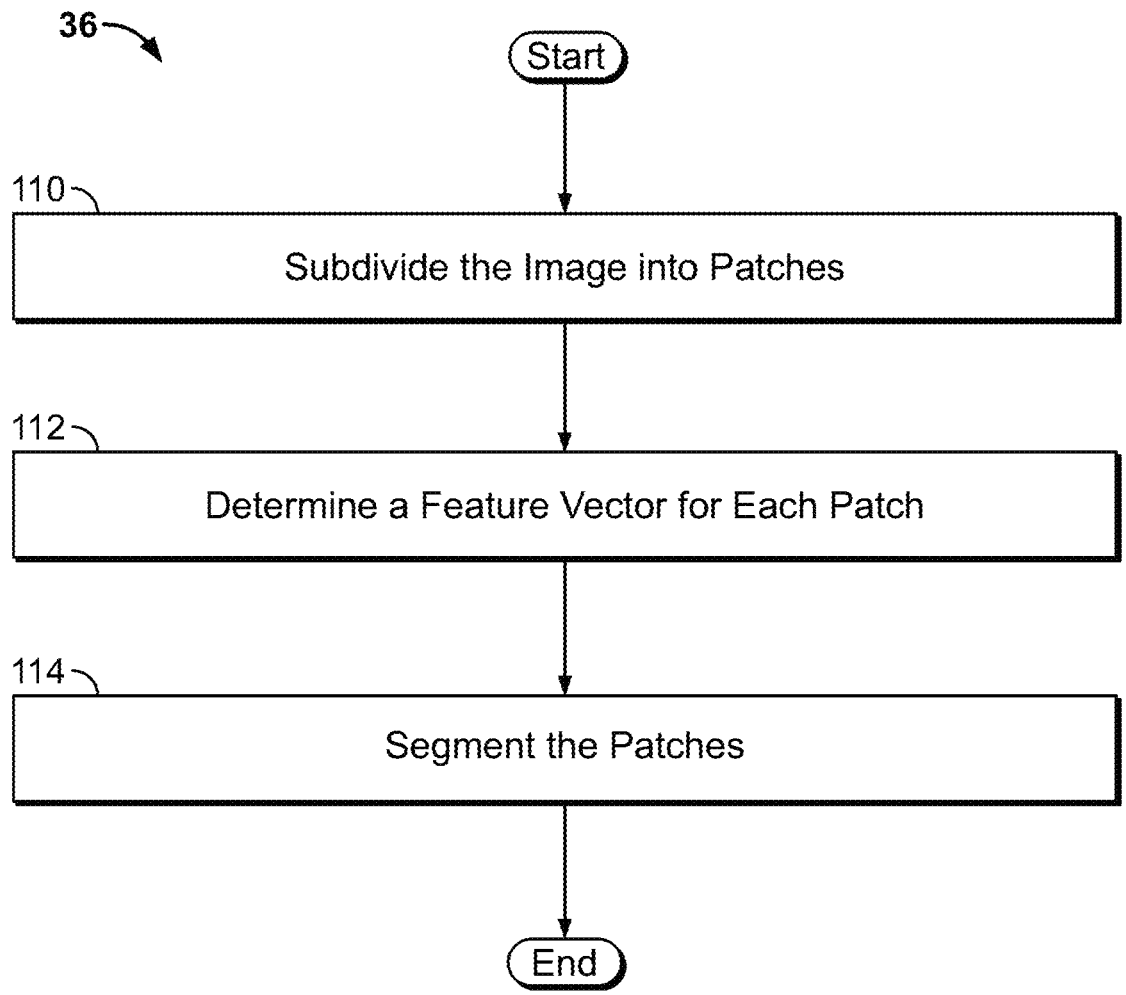
FIG. 5 is a flowchart illustrating step 36 of FIG. 2 in greater detail.

FIG. 5 is a flowchart illustrating step 36 of FIG. 2 in greater detail. In particular, FIG. 5 illustrates processing steps carried out by the system 10 during splice localization. Beginning in step 110, the system 10 subdivides a test image into 72×72×3 sized patches. Then, in step 112, the system 10 computes a hundred-dimensional feature vector, FC2 66, for each patch. An amount of overlap between neighboring patches is a hyper-parameter described in further detail below. In step 114, the system 10 executes an expectation-maximization (EM) algorithm to fit a two-component Gaussian mixture model to the feature vectors to segregate the patches into two classes utilizing a soft probabilistic classification. The system 10 re-executes this fitting one hundred times with random initializations and selects the solution with the highest likelihood. This probability map is "cleaned" of spurious noise utilizing a morphological opening (or closing) operation via a fixed disk of size two. Then, the probability map is upsampled to the original test image's dimensions and utilized to localize a tampered region. During testing, the system 10 considers each of the EM mask and its inverse as candidate masks and selects the mask having the best overlap with a ground-truth mask.

Figure 6:
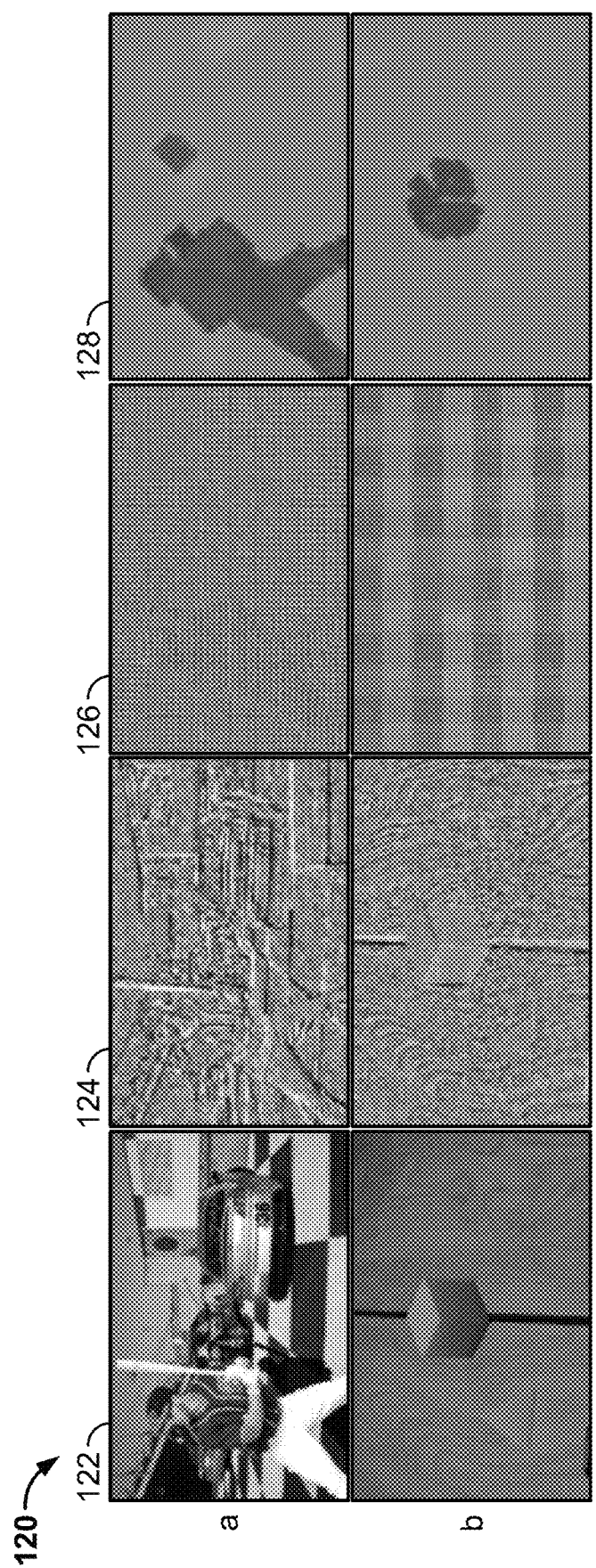
FIG. 6 is a compilation of images illustrating image processing carried out by the system of the present disclosure.

FIG. 6 is a compilation 120 of images illustrating image processing carried out by the system 10 of the present disclosure. In particular, FIG. 6 illustrates image processing carried out by the system 10 to learn low level features of input images 122*a-b* while suppressing image specific semantic information thereof. As described above, the system 10 allows for learning low level features independent of image semantics by a two-step process including residual information extraction via learned RFs and sematic edge suppression via mutual information based regularization. FIG. 6 illustrates learned rich filter images 124*a-b* corresponding to input images 122*a-b*. As shown in FIG. 6, the learned rich filter images 124*a-b* contain semantic edges. Final feature images 126*a-b* illustrate the suppression of the semantic edges in corresponding learned filter images 124*a-b*. Lastly, images 128*a-b* are output heat maps indicative of tampered regions in corresponding input images 122*a-b*. As shown in FIG. 6, the output heat maps 128*a-b* illustrate the splicing manipulations present in input images 122*a-b*.

Training, testing, and results of the system 10 will now be described in greater detail. The system 10 trains by utilizing the Dresden Image Database which consists of approximately 17,000 JPEG images sourced from 27 camera model. It should be understood that the images are not segregated based on compression quality factors because compression quality factors are considered to part of a camera model signature. The system 10 selects, for each camera model, 0.2% and 0.1% of the images as validation sets and test sets while the remaining images are utilized for training. Training comprises a mini batch size M of 50 patches and 100,000 patches per epoch chosen randomly every epoch. The system 10 trains for 130 epochs, utilizing an Adam optimizer with a constant learning rate of 1e-4 for 80 epochs which then decays exponentially by a factor of 0.9 over the remaining epochs. The system 10 yields approximately 72% camera model identification accuracy for the validation sets and the test sets for generic values for the weights in Equation 4 of $\lambda=\gamma=1$ and $\omega\approx5e-4$. The system 10 utilizes a NVIDIA GTX 1080Ti GPU but it should be understood that any suitable graphics card can be utilized.

The quantitative performance of the system 10 and results of a hyper-parameter search to determine an optimal overlap of input patches during splice localization will now be described in greater detail. The performance of the system 10 is quantitatively evaluated by testing the system 10 on three datasets, utilizing pixel level scoring metrics and comparing the system 10 with two splice detection algorithms. FIG. 7 is a table 140 illustrating test datasets utilized by the system 10. As shown in FIG. 7, the system 10 utilizes the DSO-1, NC16 and NC17-dev1 datasets for testing. The DSO-1, NC16 and NC17-dev1 datasets include realistic manipulations that are challenging to detect. For example, DSO-1 includes splicing manipulations where a human figure, in whole or in part, has been inserted into an image including other human figures. NC16 and NC17-dev1 can be considered to be more complex and challenging datasets than DSO-1 because each dataset comprises images that may include a series of manipulations that span an entirety of an image or a relatively small region of the image. Further, some of these manipulations may be post-processing operations that are designed to impede forgery detection. Each of the DSO-1, NC16 and NC17-dev1 datasets provides a binary ground-truth manipulation mask.

FIGS. 8A-C are tables 150, 160, and 170 illustrating quantitative overlap hyper parameter processing results of the system 10 for a range of pixels for different datasets and according to three different scoring metrics. In particular, table 150 illustrates results of an overlap hyper parameter search on the DSO-1 dataset, table 160 illustrates results of an overlap hyper parameter search on the NC16 dataset, and table 170 illustrates results of an overlap hyper parameter search on the NC17-dev1 dataset. The results of the aforementioned hyper parameter searches respectively determine an optimal overlap of patches during splice localization. The system 10 determines the overlap in terms of pixels stepped along an axis to move from one patch to the next. The system 10 determines a performance of the neural network 16 for steps ranging from 24 to 72 pixels on 100 images of the DSO-1 dataset and 100 randomly selected images of each of the NC16 and NC17-dev1 datasets. An F1 score, a Matthews Correlation Coefficient (MCC) and an area under the receiver operating characteristic curve (ROC-AUC) quantitatively evaluate a performance of the neural network 16. These scoring metrics are widely utilized by the digital image forensics community. As mentioned above, the system 10 generates a probability map. It should be understood that the F1 and MCC scoring metrics require a threshold to compute a pixel-level binary mask. The values of these respective scores are reported for an optimal threshold which is computed with reference to a ground-truth manipulation mask. As shown in tables 150, 160 and 170, a step of 48 pixels yields favorable results consistently. As such, the system 10 utilizes 48 pixels as the optimal step size during testing.

FIGS. 9A-C are tables 180, 190, and 200 illustrating quantitative processing results of the system 10 of the present disclosure on different datasets and in comparison to different models. The system 10 is compared with the EXIF-SC and SB splice detection algorithms. The SB splice detection algorithm is a blind approach that utilizes the co-occurrences of a residual computed from a single hand-engineered RF and EM algorithm for splice localization. The EXIF-SC splice detection algorithm applies a deep neural network to detect splices by predicting meta-data inconsistency. For each of these splice detection algorithms, the reported scores are computed by utilizing the original codes/models (left column as shown in tables 180, 190 and 200) along with the scores reported by their respective authors (right column where applicable as shown in tables 180, 190 and 200).

Table 180 of FIG. 9A, illustrates the F1 scores achieved by EXIF-SC, SB and the system 10 (i.e., SD) over the DSO-1, NC16 and NC17-dev1 datasets. As shown in table 180, the system 10 improves over EXIF-SC and SB on the DSO-1 and NC16 datasets and performs on par with EXIF-SC and SB on the NC17-dev1 dataset. Table 190 of FIG. 9B, illustrates the MCC scores achieved by EXIF-SC, SB and the system 10 over the DSO-1, NC16 and NC17-dev1 datasets. As shown in table 190, the system 10 outperforms EXIF-SC and SB on the DSO-1 and NC16 datasets and performs equally as well with SB as a top performer on the NC17-dev1 dataset. Table 200 of FIG. 9C, illustrates the ROC-AUC scores achieved by EXIF-SC, SB and the system 10 over the DSO-1, NC16 and NC17-dev1 datasets. As shown in table 200, the system 10 outperforms EXIF-SC and SB on each of the DSO-1, NC16 and NC17-dev1 datasets thereby indicating an improved global performance across all thresholds. As shown in tables 180, 190 and 200, the system 10 is comparable to EXIF-SC and SB and is some cases performs up to 4% points better than EXIF-SC and SB.

Figure 10:
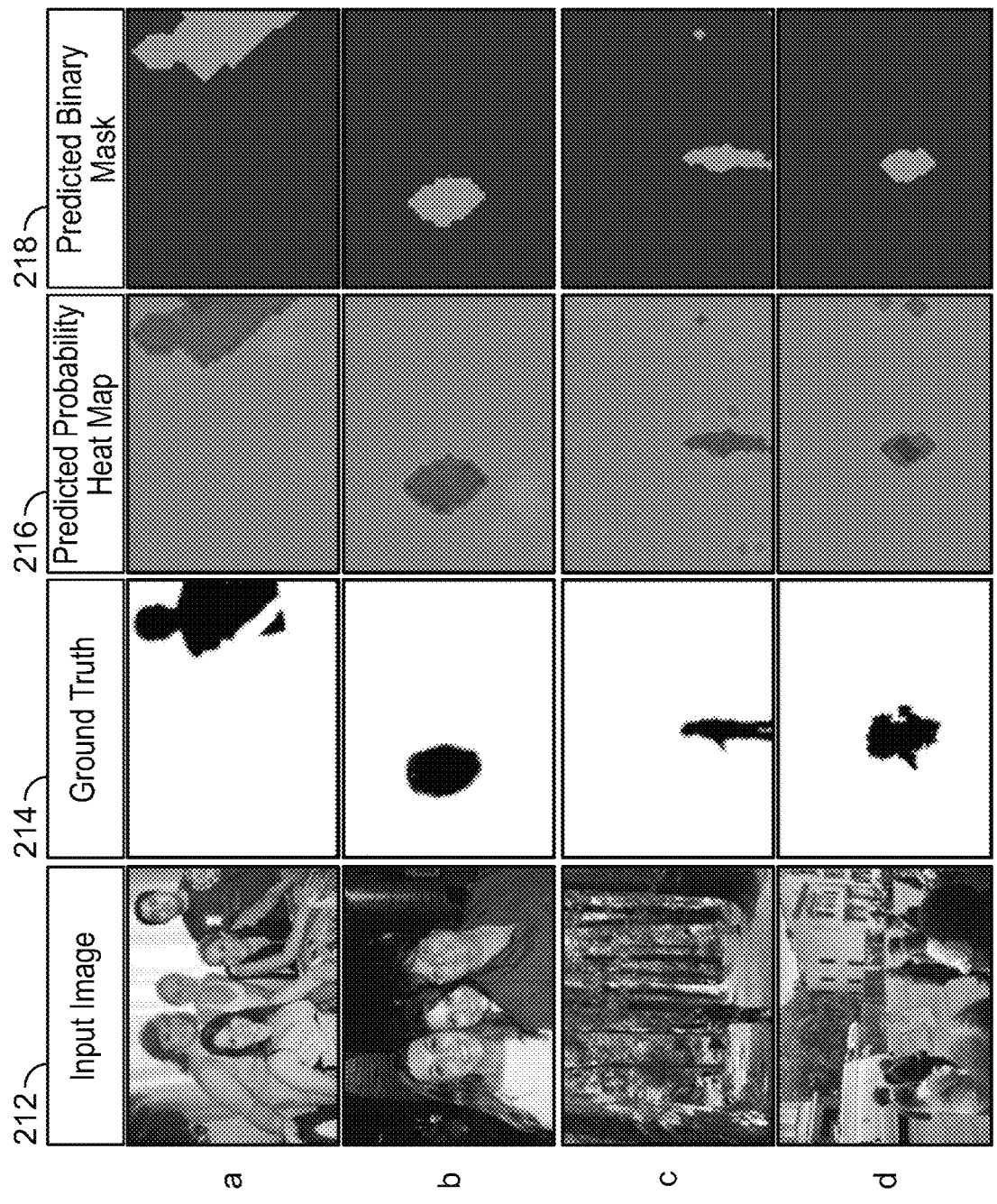
FIG. 10 is a compilation of images illustrating qualitative processing results of the system of the present disclosure based on several input images and ground truth masks thereof.

The qualitative performance of the system 10 will now be described in greater detail. FIG. 10 is a compilation 210 of images illustrating qualitative processing results of the system 10 of the present disclosure based on several input images 212a-d and ground truth masks 214a-d thereof. It should be understood that input images 212a and 212b are sourced from the DSO-1 dataset, input image 212c is sourced from the NC16 dataset and input image 212d is sourced from the NC17-dev1 dataset. As shown in FIG. 10, images 216a-d respectively illustrate probability heat maps predicted by the system 10 based on the input images 212a-d and images 218a-d respectively illustrate binary masks predicted by the system 10 based on the probability heat maps 216a-d. Each of the predicted probability heat maps 216a-d and corresponding predicted binary masks 218a-d closely mirror the ground truth images 214a-d.

Figure 11:
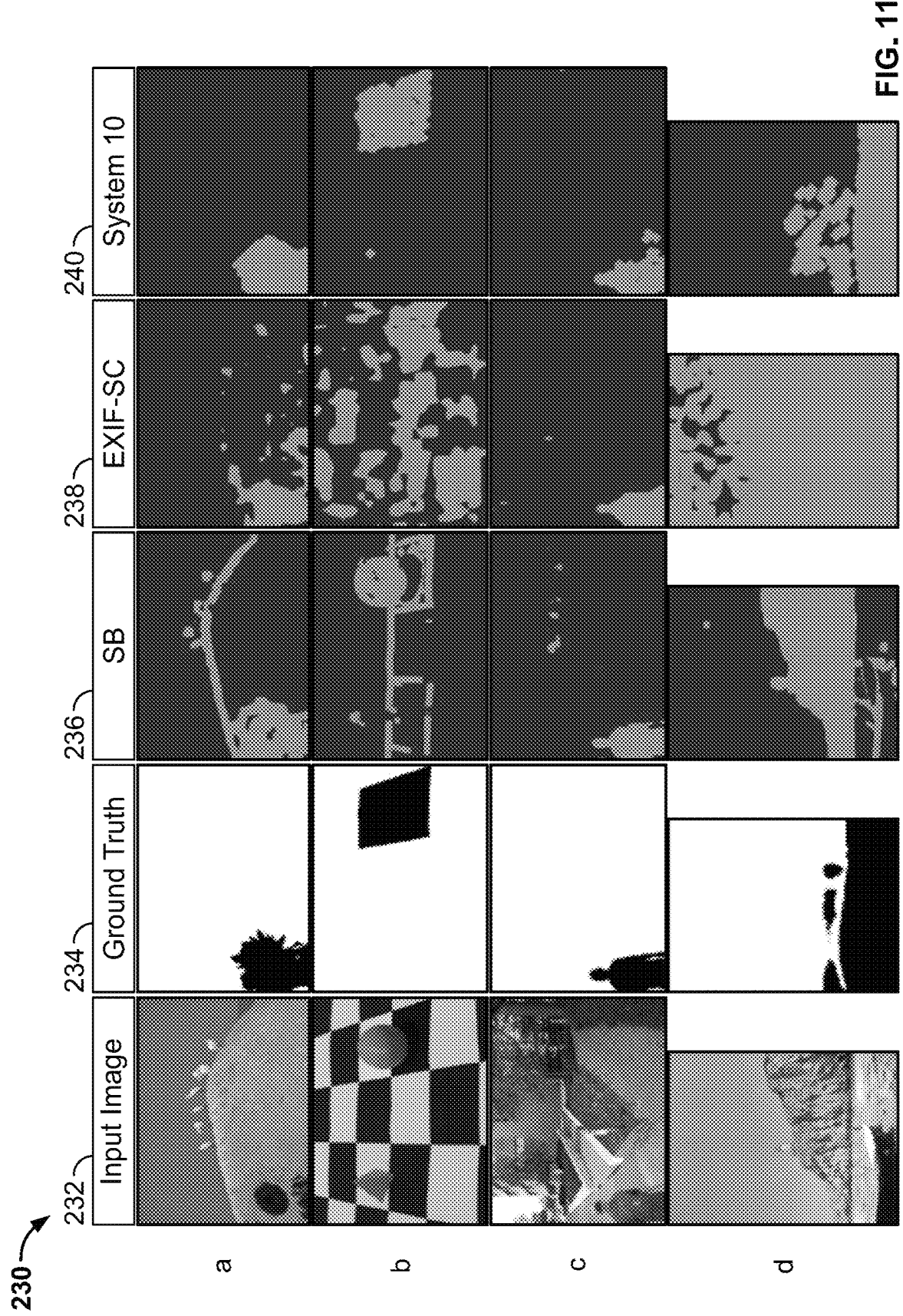
FIG. 11 is a compilation of images illustrating qualitative processing results of the system of the present disclosure in comparison to a variety of models based on several input images and ground truth masks thereof.

FIG. 11 is a compilation 230 of images illustrating qualitative processing results of the system 10 of the present disclosure in comparison to a variety of models based on several input images 232a-d and ground truth masks 234a-d thereof. It should be understood that input images 232a-b are sourced from the NC16 dataset and input images 232c-d are sourced from the NC17-dev1 dataset. Images 236a-d, 238a-d and 240a-d respectively illustrate binary masks predicted by the SB model, the EXIF-SC model and the system 10. As shown in FIG. 11, the system 10 binary masks 240a-d most closely resemble the ground truth images 234a-d in comparison to the SB and EXIF-SC models.

As described above, the system 10 allows for blind forgery (e.g., splice localization) detection by utilizing a deep CNN that learns low level features capable of segregating camera models. These low level features, independent of the semantic contents of the training images, are learned via a two-step process. In the first step, the system 10 applies a unique constrained convolution to learn relevant residuals present in an image and in the second step, the system 10 utilizes a probabilistic mutual information based regularization to suppress semantic edges present in the image. Preliminary results on the DSO-1, NC16 and NC17-dev1 test datasets evidence the potential of the system 10, indicating up to 4% points improvement over the SB and EXIF-SC models. It should be understood that additional testing of the system 10 can be performed on other datasets (e.g., the Media Forensics Challenge 2018 dataset) and in comparison to other models. System 10 performance based on the effects of JPEG compression can be evaluated. During training of the system 10, the histogram based implementation of the probabilistic mutual information based regularization proved to be computationally cumbersome. This compels certain modifications of the system 10 including utilizing a relatively small mini batch size, training for a limited number of epochs and considering a relatively small neural network 16. The system 10 can be improved by eliminating this bottleneck to train on larger models and datasets. The system 10 can also be improved by fine-tuning the neural network 16 on training data provided with each dataset.

Figure 12:
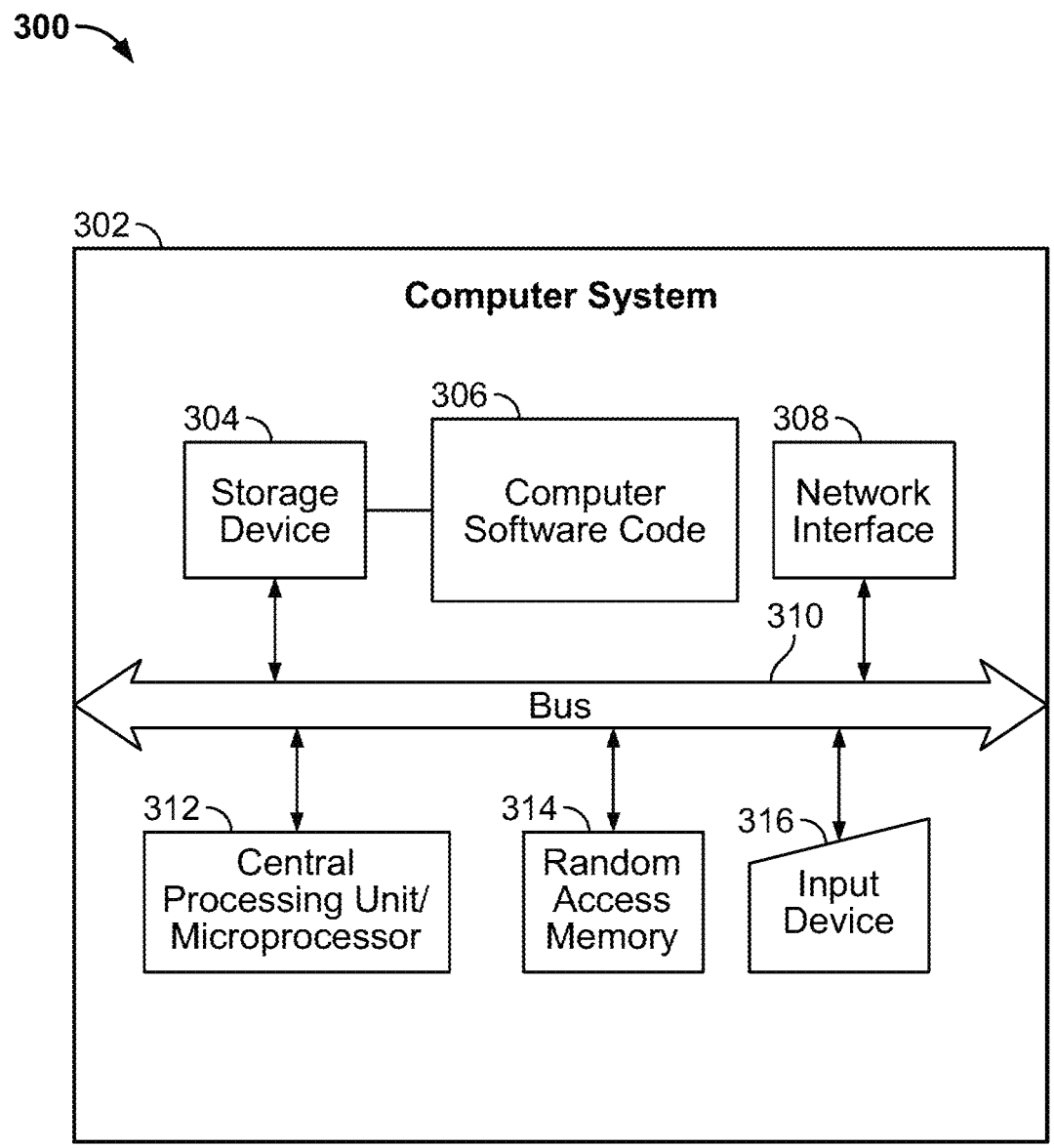
FIG. 12 is a diagram illustrating hardware and software components capable of being utilized to implement an embodiment of the system of the present disclosure.

FIG. 12 is a diagram 300 showing hardware and software components of a computer system 302 on which the system of the present disclosure can be implemented. The computer system 302 can include a storage device 304, computer software code 306, a network interface 308, a communications bus 310, a central processing unit (CPU) (microprocessor) 312, a random access memory (RAM) 314, and one or more input devices 316, such as a keyboard, mouse, etc. It is noted that the CPU 312 could also be one or more graphics processing units (GPUs). The server 302 could also include a display (e.g., liquid crystal display (LCD), cathode ray tube
(CRT), etc.). The storage device 304 could comprise any suitable, computer-readable storage medium such as disk, non-volatile memory (e.g., read-only memory (ROM), erasable programmable ROM (EPROM), electrically-erasable programmable ROM (EEPROM), flash memory, field-programmable gate array (FPGA), etc.). The computer system 302 could be a networked computer system, a personal computer, a server, a smart phone, tablet computer etc. It is noted that the server 302 need not be a networked server, and indeed, could be a stand-alone computer system.

The functionality provided by the present disclosure could be provided by computer software code 306, which could be embodied as computer-readable program code stored on the storage device 304 and executed by the CPU 212 using any suitable, high or low level computing language, such as Python, Java, C, C++, C#, .NET, MATLAB, etc. The network interface 308 could include an Ethernet network interface device, a wireless network interface device, or any other suitable device which permits the server 302 to communicate via the network. The CPU 312 could include any suitable single-core or multiple-core microprocessor of any suitable architecture that is capable of implementing and running the computer software code 306 (e.g., Intel processor). The random access memory 314 could include any suitable, high-speed, random access memory typical of most modern computers, such as dynamic RAM (DRAM), etc.

Having thus described the system and method in detail, it is to be understood that the foregoing description is not intended to limit the spirit or scope thereof. It will be understood that the embodiments of the present disclosure described herein are merely exemplary and that a person skilled in the art can make any variations and modification without departing from the spirit and scope of the disclosure. All such variations and modifications, including those discussed above, are intended to be included within the scope of the disclosure. What is desired to be protected by Letters Patent is set forth in the following claims.

What is claimed is:

1. A computer vision system for localizing image forgery comprising:
    a memory; and
    a processor in communication with the memory, the processor:
        generating a constrained convolution using a plurality of learned rich filters by computing residuals for the plurality of learned rich filters, each residual being a difference between a predicted value for a central pixel defined over a pixel neighborhood and a scaled value of a pixel;
        training a neural network with the constrained convolution and a plurality of images of a dataset to learn a low-level representation indicative of a statistical signature of at least one source camera model for each image among the plurality of images, and
        localizing an attribute of an image of the dataset by the trained neural network.

2. The system of claim 1, wherein the processor:
    extracts at least one noise residual pattern from each image among the plurality of images via the constrained convolution,
    determines a spatial distribution of the extracted at least one noise residual pattern, and
    suppresses semantic edges present in each image among the plurality of images by applying a probabilistic regularization,
    generating a constrained convolution via a plurality of learned rich filters by computing residuals for the plurality of learned rich filters, each residual being a difference between a predicted value for a central pixel defined over a pixel neighborhood and a scaled value of a pixel;
    training a neural network with the constrained convolution and a plurality of images of a dataset to learn a low-level representation indicative of a statistical signature of at least one source camera model for each image among the plurality of images, and
    localizing an attribute of an image of the dataset by the trained neural network.

3. The system of claim 2, wherein the processor trains the neural network with a complete loss function based on a cross-entropy loss function over the dataset, the probabilistic regularization, and a rich filter constraint penalty.

4. The system of claim 1, wherein the processor localizes the attribute of the image of the dataset by the trained neural network by:
    subdividing the image into a plurality of patches,
    determining a hundred-dimensional feature vector for each patch, and
    segmenting the plurality of patches by applying an expectation maximization algorithm to each patch to fit a two component Gaussian mixture model to each feature vector.

5. The system of claim 1, wherein the neural network is an 18 layer deep Convolutional Neural Network (CNN).

6. The system of claim 1, wherein the dataset is a Dresden Image dataset.

7. The system of claim 1, wherein the localized adversarial perturbation of the image is a splicing manipulation.

8. A method for localizing image forgery by a computer vision system, comprising the steps of:
subdividing the image into a plurality of patches,
determining a hundred-dimensional feature vector for each patch, and
segmenting the plurality of patches by applying an expectation maximization algorithm to each patch to fit a two component Gaussian mixture model to each feature vector.

9. The method of claim 8, further comprising:
extracting at least one noise residual pattern from each image among the plurality of images via the constrained convolution,
determining a spatial distribution of the extracted at least one noise residual pattern, and
suppressing semantic edges present in each image among the plurality of images by applying a probabilistic regularization.

10. The method of claim 9, further comprising training the neural network with a complete loss function based on a cross-entropy loss function over the dataset, the probabilistic regularization, and a rich filter constraint penalty.

11. The method of claim 8, further comprising localizing the attribute of the image of the dataset by the trained neural network by
subdividing the image into a plurality of patches,
determining a hundred-dimensional feature vector for each patch, and
segmenting the plurality of patches by applying an expectation maximization algorithm to each patch to fit a two component Gaussian mixture model to each feature vector.

12. The method of claim 8, wherein the neural network is an 18 layer deep Convolutional Neural Network (CNN).

13. The method of claim 8, wherein the localized adversarial perturbation of the image is a splicing manipulation.

14. A non-transitory computer readable medium having instructions stored thereon for localizing image forgery by a computer vision system which, when executed by a processor, causes the processor to carry out the steps of:
generating a constrained convolution via a plurality of learned rich filters by computing residuals for the plurality of learned rich filters, each residual being a difference between a predicted value for a central pixel defined over a pixel neighborhood and a scaled value of a pixel;
training a neural network with the constrained convolution and a plurality of images of a dataset to learn a low-level representation indicative of a statistical signature of at least one source camera model for each image among the plurality of images, and
localizing an attribute of an image of the dataset by the trained neural network.

15. The non-transitory computer readable medium of claim 14, the processor further carrying out the steps of:
extracting at least one noise residual pattern from each image among the plurality of images via the constrained convolution,
determining a spatial distribution of the extracted at least one noise residual pattern, and
suppressing semantic edges present in each image among the plurality of images by applying a probabilistic regularization.

16. The non-transitory computer readable medium of claim 15, the processor further carrying out the step of training the neural network with a complete loss function based on a cross-entropy loss function over the dataset, the probabilistic regularization, and a rich filter constraint penalty.

17. The non-transitory computer readable medium of claim 14, the processor localizing the attribute of the image of the dataset by the trained neural network by carrying out the steps of:
subdividing the image into a plurality of patches,
determining a hundred-dimensional feature vector for each patch, and
segmenting the plurality of patches by applying an expectation maximization algorithm to each patch to fit a two component Gaussian mixture model to each feature vector.

18. The non-transitory computer readable medium of claim 14, wherein the neural network is an 18 layer deep Convolutional Neural Network (CNN).

19. The non-transitory computer readable medium of claim 14, wherein the localized adversarial perturbation of the image is a splicing manipulation.

* * * * *

UNITED STATES PATENT AND TRADEMARK OFFICE
CERTIFICATE OF CORRECTION

PATENT NO. : 11,392,800 B2
APPLICATION NO. : 16/919840
DATED : July 19, 2022
INVENTOR(S) : Aurobrata Ghosh et al.

It is certified that error appears in the above-identified patent and that said Letters Patent is hereby corrected as shown below:

On the Title Page

On page 2, under the References Cited Other Publications Column, the twentieth reference down the second column, the word "Souice" should be deleted and replaced with the word "Source"

In the Claims

In Column 12, Line 40, Claim 2, should read as follows:
2. The system of claim 1, wherein the processor:
 extracts at least one noise residual pattern from each image among the plurality of images via the constrained convolution,
 determines a spatial distribution of the extracted at least one noise residual pattern, and
 suppresses semantic edges present in each image among the plurality of images by applying a probabilistic regularization.

In Column 13, Lines 9-15, Claim 8, should be deleted and replaced with:
 generating a constrained convolution via a plurality of learned rich filters by computing residuals for the plurality of learned rich filters, each residual being a difference between a predicted value for a central pixel defined over a pixel neighborhood and a scaled value of a pixel;
 training a neural network with the constrained convolution and a plurality of images of a dataset to learn a low-level representation indicative of a statistical signature of at least one source camera model for each image among the plurality of images, and
 localizing an attribute of an image of the dataset by the trained neural network.

Signed and Sealed this
Sixteenth Day of May, 2023

*Katherine Kelly Vidal*

Katherine Kelly Vidal
*Director of the United States Patent and Trademark Office*